United States Patent
Cheng et al.

(10) Patent No.: US 11,282,520 B2
(45) Date of Patent: Mar. 22, 2022

(54) METHOD, APPARATUS AND DEVICE FOR INTERACTION OF INTELLIGENT VOICE DEVICES, AND STORAGE MEDIUM

(71) Applicant: Baidu Online Network Technology (Beijing) Co., Ltd., Beijing (CN)

(72) Inventors: Gaofei Cheng, Beijing (CN); Fei Wang, Beijing (CN); Yan Zhang, Beijing (CN); Qin Xiong, Beijing (CN); Leilei Gao, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 324 days.

(21) Appl. No.: 16/513,624

(22) Filed: Jul. 16, 2019

(65) Prior Publication Data
US 2019/0341048 A1  Nov. 7, 2019

(30) Foreign Application Priority Data

Aug. 31, 2018 (CN) .......................... 201811014793.7

(51) Int. Cl.
*G10L 15/00* (2013.01)
*G10L 15/22* (2006.01)
(Continued)

(52) U.S. Cl.
CPC .............. *G10L 15/22* (2013.01); *G10L 15/08* (2013.01); *G10L 15/30* (2013.01); *H04L 12/282* (2013.01);
(Continued)

(58) Field of Classification Search
CPC ......... G10L 15/22; G10L 15/08; G10L 15/30; G10L 2015/088; G10L 2015/223;
(Continued)

(56) References Cited

U.S. PATENT DOCUMENTS

2017/0323642 A1  11/2017  Lindahl
2018/0061419 A1  3/2018  Casado et al.
(Continued)

FOREIGN PATENT DOCUMENTS

CN     103155444 A   6/2013
CN     105788599 A   7/2016
(Continued)

OTHER PUBLICATIONS

Second Office Action of the priority No. 201811014793.7 dated Mar. 13, 2020; 12 pages.
(Continued)

*Primary Examiner* — Charlotte M Baker
(74) *Attorney, Agent, or Firm* — Pearne & Gordon LLP

(57) ABSTRACT

Embodiments of the present application provide a method, apparatus and device for interaction of intelligent voice devices, and a storage medium. The method includes: receiving wake-up messages sent by respective awakened intelligent voice devices; determining a forwarding device according to the wake-up messages; sending a forwarding instruction to the forwarding device to enable the forwarding device to receive a user voice request according to the forwarding instruction, where the forwarding instruction includes: type skill information of all intelligent voice devices; and sending a non-response message to other awakened intelligent voice device other than the forwarding device, which enables the most appropriate response device to execute the cloud result requested by the forwarding device, and the plurality of awakened intelligent voice devices do not respond at the same time so as to avoid confusion, thus making it easier to meet user needs.

16 Claims, 7 Drawing Sheets

(51) Int. Cl.
  *G10L 15/08* (2006.01)
  *G10L 15/30* (2013.01)
  *H04L 12/28* (2006.01)

(52) U.S. Cl.
  CPC .. *G10L 2015/088* (2013.01); *G10L 2015/223* (2013.01)

(58) Field of Classification Search
  CPC ... G10L 15/26; H04L 12/282; H04L 12/4625; H04L 67/10; G06F 3/167
  USPC .......... 704/251, 275, 254, E11.011, E14.005
  See application file for complete search history.

(56) References Cited

U.S. PATENT DOCUMENTS

| | | | |
|---|---|---|---|
| 2018/0176296 A1 | 6/2018 | Atia et al. | |
| 2018/0322870 A1* | 11/2018 | Lee | G10L 15/26 |
| 2019/0214011 A1* | 7/2019 | Shin | G10L 15/28 |

FOREIGN PATENT DOCUMENTS

| | | |
|---|---|---|
| CN | 106469040 A | 3/2017 |
| CN | 106707788 A | 5/2017 |
| CN | 106878071 A | 6/2017 |
| CN | 106951209 A | 7/2017 |
| CN | 108259280 A | 7/2018 |
| CN | 108320742 A | 7/2018 |
| EP | 3316121 A1 | 2/2018 |
| JP | 2006352281 A | 12/2006 |
| JP | 2008210103 A | 9/2008 |
| JP | 2009026191 A | 2/2009 |
| WO | 2018067531 A1 | 4/2018 |
| WO | 2018075660 A1 | 4/2018 |

OTHER PUBLICATIONS

CNBLUSP201904540—The Office Action of the corresponding JP application dated Sep. 28, 2020; 3 pages.
First Office Action of the priority No. 201811014793.7 dated Nov. 21, 2019; 10 pages.

* cited by examiner

METHOD, APPARATUS AND DEVICE FOR INTERACTION OF INTELLIGENT VOICE DEVICES, AND STORAGE MEDIUM

CROSS-REFERENCE TO RELATED APPLICATION

This patent application claims the benefit of Chinese Patent Application No. 201811014793.7, entitled "Method, Apparatus and Device for Interaction of Intelligent Voice Devices, And Storage Medium," filed Aug. 31, 2018, which is incorporated in its entirety here by this reference.

TECHNICAL FIELD

The embodiments of the present application relate to the technical field of intelligent voice devices, and in particular, to a method, apparatus and device for interaction of intelligent voice devices, and a storage medium.

BACKGROUND

With the increasing of intelligent voice devices, various types of intelligent voice devices, such as intelligent voice speakers, intelligent voice TV, intelligent voice air conditioner and other equipment may exist in one home. When a user gives a voice demand to an intelligent voice device, the demand should be responded by the most appropriate voice device. For example, in a case where the user says "I want to watch a movie" to the speaker, the result being handled by a smart TV is the most beneficial interaction for the user experience. In another case, when the user says "adjust the temperature of the air conditioner to 26 degrees" to the TV, the operation should be performed by the air conditioner.

In the prior art, since each of the intelligent voice devices is a far-field device, the intelligent voice devices are not connected to each other, and each intelligent voice device independently responds. As there is no synergy among the intelligent voice devices, if each of the intelligent voice devices is awakened, all the intelligent voice devices will respond at the same time. Or the user gives a voice instruction in front of an intelligent voice device, however the intelligent voice device has no execution capability, and the device with the execution capability is too far away from the user to be awakened and execute the instruction.

Therefore, the most appropriate voice device among the intelligent voice devices of the prior art cannot respond to the user's demand, thus resulting in the failure of meeting the requirement of the user for the intelligent voice device.

SUMMARY

The embodiments of the present application provides a method, apparatus and device for interaction of intelligent voice devices, and a storage medium, which solves the technical problem that the most appropriate voice device among the intelligent voice devices cannot respond to the user's demand, and overcomes the failure of meeting the requirement of the user for the intelligent voice device in the prior art.

The first aspect of the embodiment of the present application provides a method for interaction of intelligent voice devices, including receiving wake-up messages sent by respective awakened intelligent voice devices; determining a forwarding device according to the wake-up messages; sending a forwarding instruction to the forwarding device to enable the forwarding device to receive a user voice request according to the forwarding instruction, where the forwarding instruction includes: type skill information of all intelligent voice devices; and sending a non-response message to other awakened intelligent voice device other than the forwarding device.

The second aspect of the embodiment of the present application provides a method for interaction of intelligent voice devices, including sending a wake-up message to a master device; receiving a forwarding instruction sent by the master device, where the forwarding instruction includes: type skill information of all intelligent voice devices; receiving a user voice request; sending the user voice request and the type skill information of all the intelligent voice devices to a cloud device; receiving response data and network information of a response device sent by the cloud device; and sending an execution instruction including the response data to the response device according to the network information of the response device such that the response device executes the response data according to the execution instruction.

The third aspect of the embodiment of the present application provides a method for interaction of intelligent voice devices, including receiving a user voice request and type skill information of all intelligent voice devices sent by a forwarding device; obtaining response data according to the user voice request; selecting a response device according to the user voice request and the type skill information of all the intelligent voice devices; and sending the response data and network information of the response device to a forwarding device.

The fourth aspect of the embodiment of the present application provides an apparatus for interaction of intelligent voice devices, including a receiving module, configured to receive wake-up messages sent by respective awakened intelligent voice devices; a determining module, configured to determine a forwarding device according to the wake-up messages; a sending module, configured to send a forwarding instruction to the forwarding device to enable the forwarding device to receive a user voice request according to the forwarding instruction, where the forwarding instruction includes: type skill information of all intelligent voice devices; and the sending module is further configured to send a non-response message to other awakened intelligent voice device other than the forwarding device.

The fifth aspect of the embodiment of the present application provides an apparatus for interaction of intelligent voice devices, including a sending module, configured to send a wake-up message to a master device; a receiving module, configured to receive a forwarding instruction sent by the master device, where the forwarding instruction comprises: type skill information of all intelligent voice devices; the receiving module is further configured to receiving a user voice request; the sending module is further configured to send the user voice request and the type skill information of all the intelligent voice devices to a cloud device; the receiving module is further configured to receive response data and network information of a response device sent by the cloud device; and the sending module is further configured to send an execution instruction comprising the response data to the response device according to the network information of the response device such that the response device executes the response data according to the execution instruction.

The sixth aspect of the embodiment of the present application provides an apparatus for interaction of intelligent voice devices, including a receiving module, configured to receive a user voice request and type skill information of all intelligent voice devices sent by a forwarding device; an obtaining module, configured to obtain response data according to the user voice request; a selecting module, configured to select a response device according to the user voice request and the type skill information of all the intelligent voice devices; and a sending module, configured to send the response data and network information of the response device to a forwarding device.

The seventh aspect of the embodiment of the present application provides a master device, including a memory, a processor and a computer program; where the computer program is stored in the memory and configured to be executed by the processor so as to implement the method according to the first aspect.

The eighth aspect of the embodiment of the present application provides a forwarding device, including a memory, a processor and a computer program; where the computer program is stored in the memory and configured to be executed by the processor so as to implement the method according to the second aspect.

The ninth aspect of the embodiment of the present application provides a cloud device, including a memory, a processor and a computer program; where the computer program is stored in the memory and configured to be executed by the processor so as to implement the method according to the third aspect.

The tenth aspect of the embodiment of the present application provides a computer readable storage medium, having a computer program stored thereon, where the program is executed by a processor so as to implement the method according to the first aspect.

The eleventh aspect of the embodiment of the present application provides a computer readable storage medium, having a computer program stored thereon, where the program is executed by a processor so as to implement the method according to the second aspect.

The twelfth aspect of the embodiment of the present application provides a computer readable storage medium, having a computer program stored thereon, where the program is executed by a processor so as to implement the method according to the third aspect.

Based on the above aspects, in the embodiments of the present application, wake-up messages sent by respective awakened intelligent voice devices are received; a forwarding device is determined according to the wake-up messages; a forwarding instruction is sent to the forwarding device to enable the forwarding device to receive a user voice request according to the forwarding instruction, where the forwarding instruction includes: type skill information of all intelligent voice devices; and then a non-response message is sent to other awakened intelligent voice device other than the forwarding device. The plurality of intelligent voice devices are interconnected, thus the cloud result requested by the forwarding device can be executed by the most appropriate response device; and the plurality of awakened intelligent voice devices do not respond at the same time, thereby avoiding confusion; further, the capabilities of the intelligent voice devices are complementary to each other, thus making it easier to meet user needs.

It is to be understood that the above content of the summary is not intended to limit the key or important features of the embodiment or the scope of the present application. Other features of the present application will be readily understood by the following description.

DETAILED DESCRIPTION OF THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

The terms "first", "second", "third", "fourth", etc. (if present) in the specification of the embodiments of the present application, claims and the above figures are used to distinguish between similar objects, but not to describe a particular order or sequence. It is to be understood that the data so used may be interchanged where appropriate, such that the embodiments described herein can be implemented, for example, in a sequence other than those illustrated or described herein. In addition, the terms "comprise", "have" and any variation thereof are intended to cover a non-exclusive inclusion, for example, a process, method, system, product, or device that comprises a series of steps or units is not necessarily limited to those steps or units explicitly listed, and may include other steps or units not explicitly listed or inherent to such processes, methods, products or devices.

In order to clearly understand the technical solutions of the present application, the application scenarios of the present application are described below.

Figure 1:
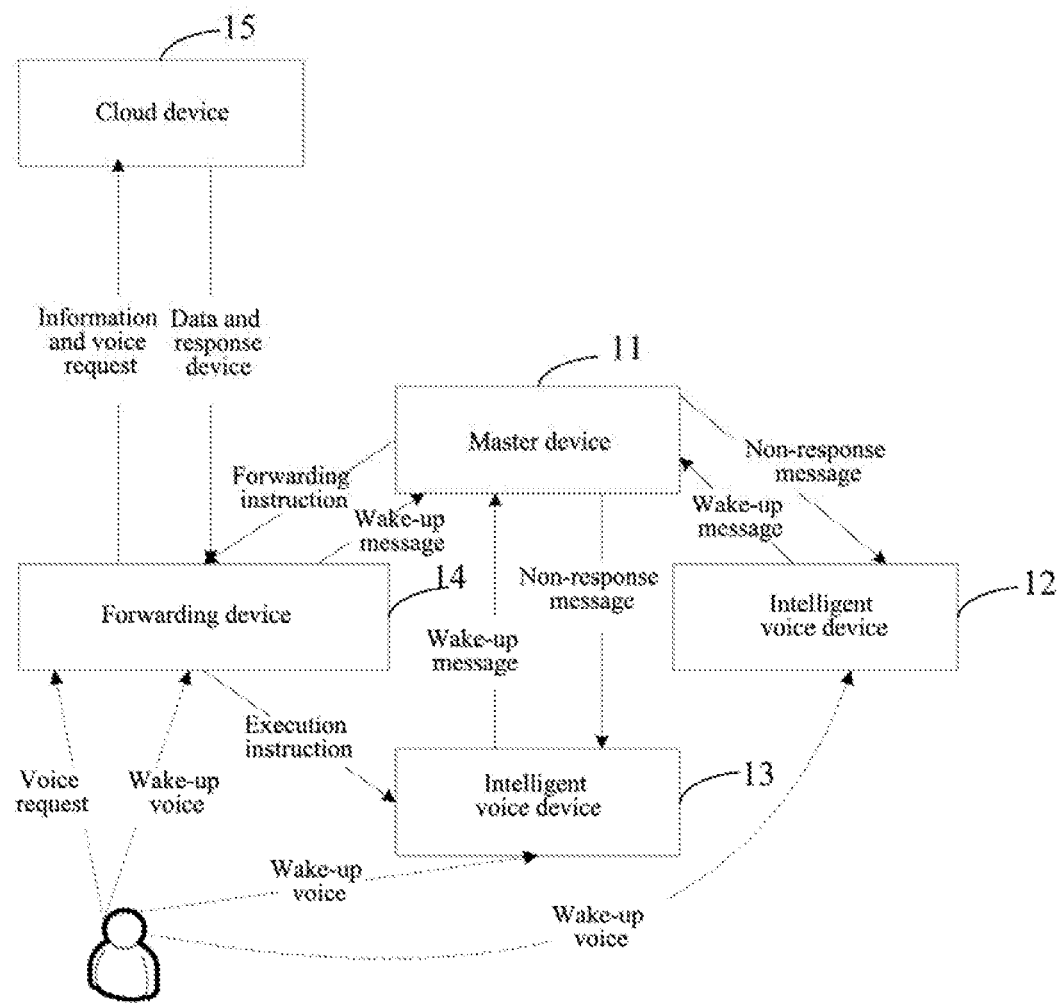
FIG. 1 shows an application scenario diagram of a method for interaction of intelligent voice devices according to an embodiment of the present application.

FIG. 1 is an application scenario diagram of a method for interaction of intelligent voice devices according to an embodiment of the present application. As shown in FIG. 1, in an application scenario of a method for interaction of intelligent voice devices provided in this embodiment, the constructed interaction system between the intelligent voice devices includes: a plurality of intelligent voice devices and a cloud device 15. There are network connections among the intelligent voice devices. For convenience, in the description of FIG. 1, some network connection relationships are not illustrated. A master device 11 is selected from the respective intelligent voice devices, and the master device 11 communicates with other intelligent voice devices to obtain the type skill information of each intelligent voice device. The user sends a wake-up voice to awaken at least one intelligent voice device, and the awakened intelligent voice devices 12, 13, 14 send wake-up messages to the master device 11. The master device 11 determines a forwarding device 14 from the respective awakened intelligent voice devices according to the wake-up message. The master device 11 transmits the type skill information of all the intelligent voice devices in the network to the forwarding device 14, and the master device 11 sends non-response messages to the awakened intelligent voice devices 12, 13 other than the forwarding device. The forwarding device 14 receives a user voice request, and sends the user voice request and the type skill information of all the intelligent voice devices in the network to the cloud device 15. The cloud device 15 obtains the response data according to the user voice request, and selects a response device according to the user voice request and type skill information of all the intelligent voice devices. The response device is an intelligent voice device that is most appropriate to respond to the user voice request. The cloud device 15 sends the response data and network information of the response device to the forwarding device 14; the forwarding device 14 sends an execution instruction to the response device according to the network information of the response device. The response device selected in FIG. 1 is the intelligent voice device 13, and the response device executes response data in accordance with an execution instruction. The plurality of intelligent voice devices can be interconnected, the user voice request is obtained by the intelligent voice device that is most appropriate for forwarding, and forwarded to the cloud device. Then the most appropriate response device is selected by the cloud device according to the user voice request and type skill information of all the intelligent voice devices. The response data is obtained according to the user voice request, and executed by the most appropriate response device. The plurality of intelligent voice devices do not respond at the same time in the interaction, thus avoiding the confusion, and the capabilities of the plurality of intelligent voice devices are complementary to each other, which makes it easier to meet user needs.

Embodiments of the present application will be specifically described below with reference to the drawings. It should be noted that, in each embodiment of the present application, there are network connections among the intelligent voice devices.

Embodiment 1

FIG. 1 is flowchart of a method for interaction of intelligent voice devices according to Embodiment 1 of the present application; as shown in FIG. 1, the execution body of the embodiment of the present application is an apparatus for interaction of intelligent voice devices. The apparatus for interaction of intelligent voice devices can be integrated on the master device, the master device can be an intelligent voice device, such as an intelligent speaker, a smart TV, an intelligent refrigerator, a smart phone, and a smart watch. The method for interaction of the intelligent voice devices provided by this embodiment includes the following steps.

Step 201: receiving wake-up messages sent by respective awakened intelligent voice device.

Specifically, in this embodiment, the voice wake-up function is enabled on each intelligent voice device. When the user gives voice information including a wake-up word, the intelligent device that is closer to the user is awakened, and the master device receives the wake-up message sent by each of the awakened intelligent voice devices;

where the wake-up message includes: a wake-up event, and the wake-up event may include: a wake-up word. The wake-up message also includes information for detecting a distance between the user and the awakened intelligent voice device, such as the volume strength of the wake-up word in the wake-up message.

It can be understood that the master device may also be an awakened intelligent voice device which also receives its own wake-up message.

Step 202: determining a forwarding device according to the wake-up messages.

Specifically, in this embodiment, the distance between each awakened intelligent voice device and the user may be determined according to the information in the wake-up message; an awakened intelligent voice device closest to the user is selected from the awakened intelligent devices, and determined as the forwarding device;

where the method for determining the awakened intelligent voice device that is closest to the user by using the wake-up message is not limited in this embodiment.

In this case, the forwarding device is a device responsible for forwarding user voice requests between the user and the cloud device, forwarding the response data obtained by the cloud device to the most appropriate response device, and forwarding the execution instruction to the most appropriate response device.

Step 203: sending a forwarding instruction to the forwarding device to enable the forwarding device to receive the user voice request according to the forwarding instruction, where the forwarding instruction includes: type skill information of all intelligent voice devices;

where the type skill information of all the intelligent voice devices is pre-stored in the master device. The type skill information of the intelligent voice device includes: type information and skill information of the intelligent voice device. The type information of the intelligent voice device includes, for example, a speaker, a TV, a refrigerator, a mobile phone, a watch, etc. The skill information of the intelligent voice device indicates the capabilities of the intelligent voice device. For smart phones, the skill information includes: large-screen video play, small-screen video play, music play, photo capturing, video recording, video call, image display, and etc. The network information of all intelligent voice devices may also be pre-stored in the master device; where the network information of the intelligent device includes: a network IP address.

In this embodiment, the stored type skill information of all the intelligent voice devices may be stored in the form of a list.

Specifically, in this embodiment, the type skill information of all the intelligent voice devices is carried in the forwarding instruction, and the forwarding instruction is sent to the forwarding device, so that the forwarding device receives the user voice request according to the forwarding instruction, and sends the user voice request and the type skill information of all the intelligent voice devices to the cloud device. The cloud device identifies the response data required by the user according to the user voice request, and obtains response data; the cloud device further selects the most appropriate response device according to the user voice request and the type skill information of all the intelligent voice devices, and sends the response data and the network information of the response device to the forwarding device. The forwarding device sends an execution instruction including response data to the response device according to the network information of the response device, so that the response device executes the response data according to the execution instruction.

Step 204: sending a non-response message to other awakened intelligent voice device other than the forwarding device.

Specifically, in this embodiment, in order to make all the awakened intelligent voice devices do not respond before the most appropriate response device is selected by the cloud device, the non-response message is sent to other awakened intelligent voice device other than the forwarding device. After receiving the non-response message, other awakened intelligent voice device other than the forwarding device will make no response even if a user voice request is received.

In the method for interaction of intelligent voice devices provided by the present embodiment, a wake-up message sent from each awakened intelligent voice device is received; a forwarding device is determined according to the wake-up message; a forwarding instruction is sent to the forwarding device to enable the forwarding device to receive the user voice request according to the forwarding instruction, where the forwarding instruction includes: type skill information of all intelligent voice devices; then a non-response message is sent to other awakened intelligent voice device other than the forwarding device. The plurality of intelligent voice devices are interconnected, thereby the most appropriate response device can execute the cloud result requested by the forwarding device; and the plurality of awakened intelligent voice devices do not respond at the same time, thereby avoiding the confusion; further the capabilities of the intelligent voice devices are complementary to each other, which makes it easier to meet user needs.

Figure 3:
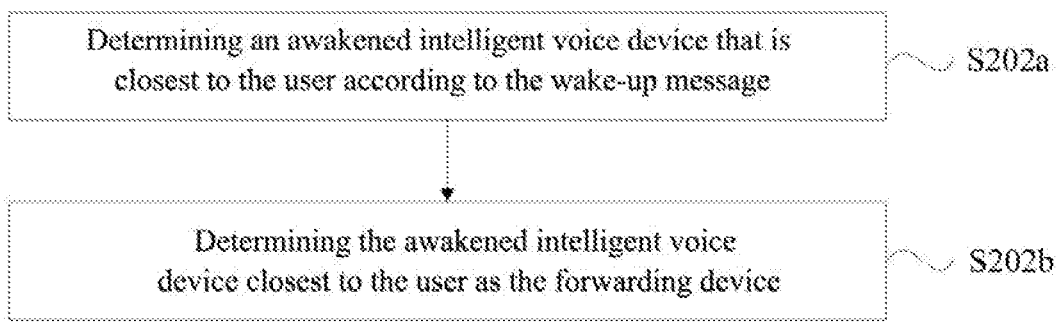
FIG. 3 shows flowchart of step 202 of a method for interaction of intelligent voice devices according to Embodiment 1 of the present application.

Furthermore, FIG. 3 is flowchart of step 202 of a method for interaction of intelligent voice devices according to Embodiment 1 of the present application; as shown in FIG. 3, in the method for interaction of intelligent voice devices provided in this embodiment, the step 202: determining a forwarding device according to the wake-up messages includes the following steps.

Step 202*a*: determining an awakened intelligent voice device that is closest to the user according to the wake-up message.

Preferably, in this embodiment, the determining an awakened intelligent voice device that is closest to the user according to the wake-up message specifically includes:

obtaining the volume strengths of the wake-up message sent by the respective intelligent voice devices;

where in this embodiment, the wake-up message includes a wake-up event, and the wake-up event includes an wake-up word; and the wake-up message further includes a volume strength of the wake-up word. Therefore, in this embodiment, firstly, the volume strength of the wake-up message sent by each intelligent voice device is obtained by obtaining the volume strength of the wake-up word in the wake-up message sent by each intelligent voice device;

secondly, an awakened intelligent voice device corresponding to the wake-up message with the highest volume strength is determined as the awakened intelligent voice device closest to the user.

Further, in this embodiment, since the sound wave is attenuated during the transmission, the distance between the user and each awakened intelligent voice device can be determined according to the volume of the wake-up message, and the awakened intelligent voice device corresponding to the wake-up message with the highest volume strength is obtained. Then the awakened intelligent voice device corresponding to the wake-up message with the highest volume strength is determined as the awakened intelligent voice device closest to the user.

In step 202*b*, determining the awakened intelligent voice device closest to the user as the forwarding device.

Further, in this embodiment, as the forwarding device is a device responsible for forwarding user voice requests between the user and the cloud device, determining the awakened intelligent voice device closest to the user as the forwarding device makes the user voice request can be accurately received, such that the cloud device obtains the response data according to the user voice request sent by the forwarding device, and determines the matched response device that is most appropriate for the response according to the user voice request.

Further, in the method for interaction of intelligent voice devices provided in this embodiment, when a forwarding device is determined according to the wake-up message, volume strengths of the wake-up messages sent by the respective intelligent voice device are obtained; then an awakened intelligent voice device corresponding to the wake-up message with the highest volume strength is determined as the awakened intelligent voice device closest to the user; and the awakened intelligent voice device closest to the user is determined as the forwarding device. Determining the awakened intelligent voice device closest to the user as the forwarding device makes the user voice request can be accurately received, such that the cloud device obtains the response data more accurately according to the user voice request sent by the forwarding device, and determines the matched response device that is most appropriate for the response according to the user voice request more accurately.

Embodiment 2

Figure 4:
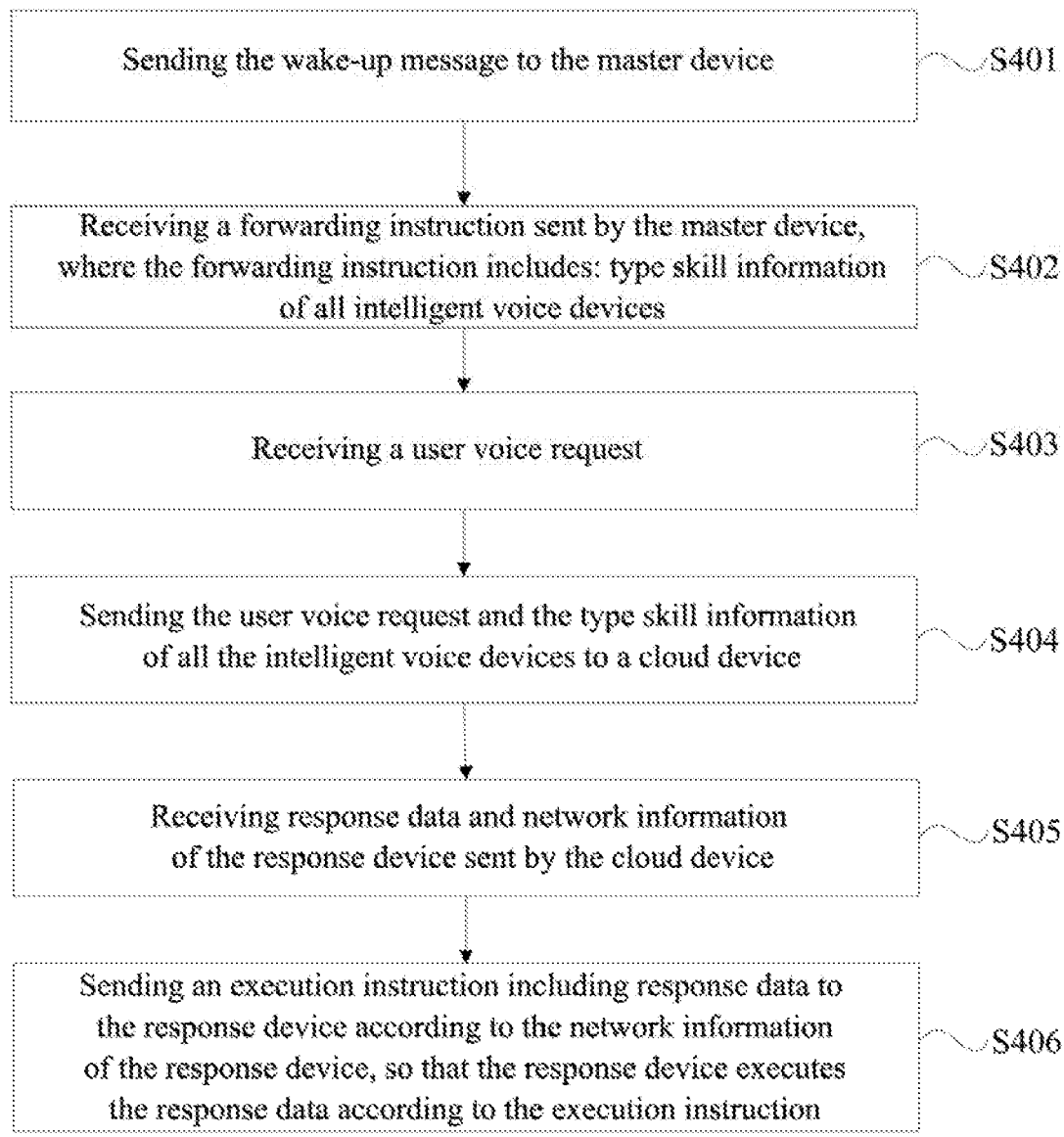
FIG. 4 shows flowchart of a method for interaction of intelligent voice devices according to Embodiment 2 of the present application.

FIG. 4 is flowchart of a method for interaction of intelligent voice devices according to Embodiment 2 of the present application; as shown in FIG. 4, the execution body of the embodiment of the present application is an apparatus for interaction of intelligent voice devices. The apparatus for interaction of intelligent voice devices can be integrated on the forwarding device, the forwarding device can be an intelligent voice device, such as an intelligent speaker, a smart TV, an intelligent refrigerator, a smart phone, and a smart watch. The method for interaction of the intelligent voice devices provided by this embodiment includes the following steps.

Step 401: sending the wake-up message to the master device.

Specifically, in this embodiment, the voice wake-up function is enabled on each intelligent voice device. When the user gives the voice information including a wake-up word, the intelligent device that is closer to the user is awakened, and the awakened intelligent voice device sends a wake-up message to the master device. As the awakened intelligent voice device includes a forwarding device, the forwarding device also sends a wake-up message to the master device, where the wake-up message includes: a wake-up event, and the wake-up event may include: a wake-up word. The wake-up message also includes information for detecting a distance between the user and the awakened intelligent voice device, such as the volume strength of the wake-up word in the wake-up message.

It should be noted that after receiving the wake-up message, the master device determines the forwarding device according to the wake-up message.

Step 402: receiving a forwarding instruction sent by the master device, where the forwarding instruction includes: type skill information of all intelligent voice devices.

Specifically, in this embodiment, the forwarding instruction which is sent by the master device and carries the type skill information of all the intelligent voice devices is received, where the type skill information of the intelligent voice device includes: type information and skill information of the intelligent voice device, and the type information of the intelligent voice device includes, for example, a speaker, a TV, a refrigerator, a mobile phone, a watch, etc. The skill information of the intelligent voice device indicates the capabilities of the intelligent voice device. For smart phones, the skill information includes: large-screen video play, small-screen video play, music play, photo capturing, video recording, video call, image display, and etc.

Step 403: receiving a user voice request.

Specifically, in this embodiment, the forwarding device has turned on the microphone and can receive the user voice request, where the illustrative examples of the user voice request can be "I want to watch a movie", "I want to listen to music" and so on.

Step 404: sending the user voice request and the type skill information of all the intelligent voice devices to a cloud device.

Specifically, in this embodiment, the user voice request and the type skill information of all the intelligent voice devices are forwarded to the cloud device, so that the cloud device identifies the user voice request and obtains the response data matching the user voice request, and further obtains a response device matching the user voice request from the type skill information of all the intelligent voice devices according to the user voice request. If there are a plurality of matched response devices, one responding device may be randomly selected.

In the present embodiment, the obtaining a response device matching the user voice request from the type skill information of all the intelligent voice devices according to the user voice request is illustrated as follows: if the user voice request is "I want to watch a movie", an intelligent voice device having the screen playing skill, such as a smart TV, is obtained from the type skill information of all the intelligent voice devices, and the smart TV is taken as a matched response device.

Step 405: receiving response data and network information of the response device sent by the cloud device.

Step 406: sending an execution instruction including response data to the response device according to the network information of the response device, so that the response device executes the response data according to the execution instruction.

Specifically, in this embodiment, after obtaining the response data and the corresponding response device, the cloud device sends the response data and the network information of the response device to the forwarding device. The forwarding device sends an execution instruction to the response device according to the network information of the response device. The response data is carried in the execution instruction. The response device receives the execution instruction and executes the response data according to the execution instruction.

In the method for interaction of intelligent voice devices provided by the present embodiment, a wake-up message is sent to the master device; a forwarding instruction sent by the master device is received, where the forwarding instruction includes: type skill information of all intelligent voice devices; a user voice request is received; the user voice request and the type skill information of all the intelligent voice devices are sent to a cloud device; response data and network information of the response device sent by the cloud device are received; an execution instruction including response data is sent to the response device according to the network information of the response device, so that the response device executes the response data according to the execution instruction. The plurality of intelligent voice devices are interconnected, thereby the most appropriate response device can execute the cloud result requested by the forwarding device; and the plurality of awakened intelligent voice devices do not respond at the same time, thereby avoiding the confusion; further the capabilities of the intelligent voice devices are complementary to each other, which makes it easier to meet user needs.

Figure 5:
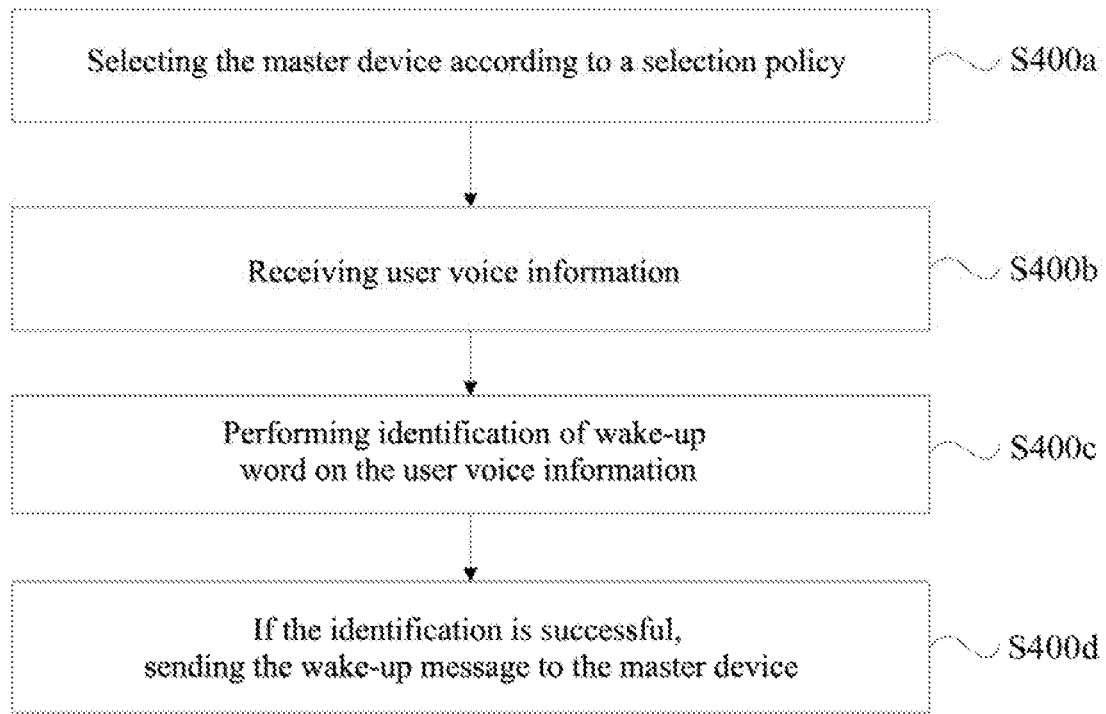
FIG. 5 shows a flowchart of a method for interaction of intelligent voice devices according to Embodiment 2 of the present application.

Further, FIG. 5 is a flowchart of a method for interaction of intelligent voice devices according to Embodiment 2 of the present application; in this embodiment, before performing step 401, the following steps are further included.

Step 400*a*: selecting the master device according to a selection policy.

Specifically, in this embodiment, after the network connection is established among the plurality of intelligent voice devices, selecting one master device according to the selection policy from the plurality of intelligent voice devices including the forwarding device.

Further, in this embodiment, the selecting the master device according to a selection policy specifically includes:

firstly, obtaining joining times of all the intelligent voice devices joining the network.

secondly, selecting an intelligent voice device with an earliest joining time as the master device.

Further, in this embodiment, it is possible to determine the join time when each intelligent voice device joins the network, and to select the intelligent voice device with the earliest joining time from all the intelligent voice network devices as the master device.

Alternatively, in this embodiment, the selecting the master device according to a selection policy specifically includes:

selecting the master device from all the intelligent voice devices by means of a raft algorithm;

where the raft algorithm is a consensus algorithm by which the master device can be selected from all the intelligent voice devices.

Step 400b: receiving user voice information.

Further, in this embodiment, each intelligent voice device has a voice collecting device which may be a microphone, and may receive user voice information through the voice collecting device.

Step 400c, performing identification of a wake-up word on the user voice information.

Further, in this embodiment, identification of the wake-up word may be performed on the user voice information by means of the voice recognition algorithm, where the wake-up word can be a common name of all intelligent voice devices, for example, "Xiaoming".

Step 400d: if the identification is successful, sending the wake-up message to the master device.

Further, in this embodiment, if the identification is successful, it is determined that the intelligent voice device is awakened, and then the wake-up message is sent to the master device.

Before sending the wake-up message to the master device, the method for interaction of intelligent voice devices further includes: selecting the master device according to a selection policy, specifically, selecting the master device according to the selection policy may be: obtaining the joining times of all the intelligent voice devices joining the network, and selecting an intelligent voice device with an earliest joining time as the master device. Alternatively, selecting the master device according to a selection policy may be: selecting the master device from all the intelligent voice devices by means of a raft algorithm. The identifier information, network information and type skill information of the plurality of intelligent voice devices can be managed by the selected master device, such that the forwarding device can be better selected, and the plurality of awakened devices can be controlled not to respond before the most appropriate response device is determined by the cloud device.

Embodiment 3

Figure 6:
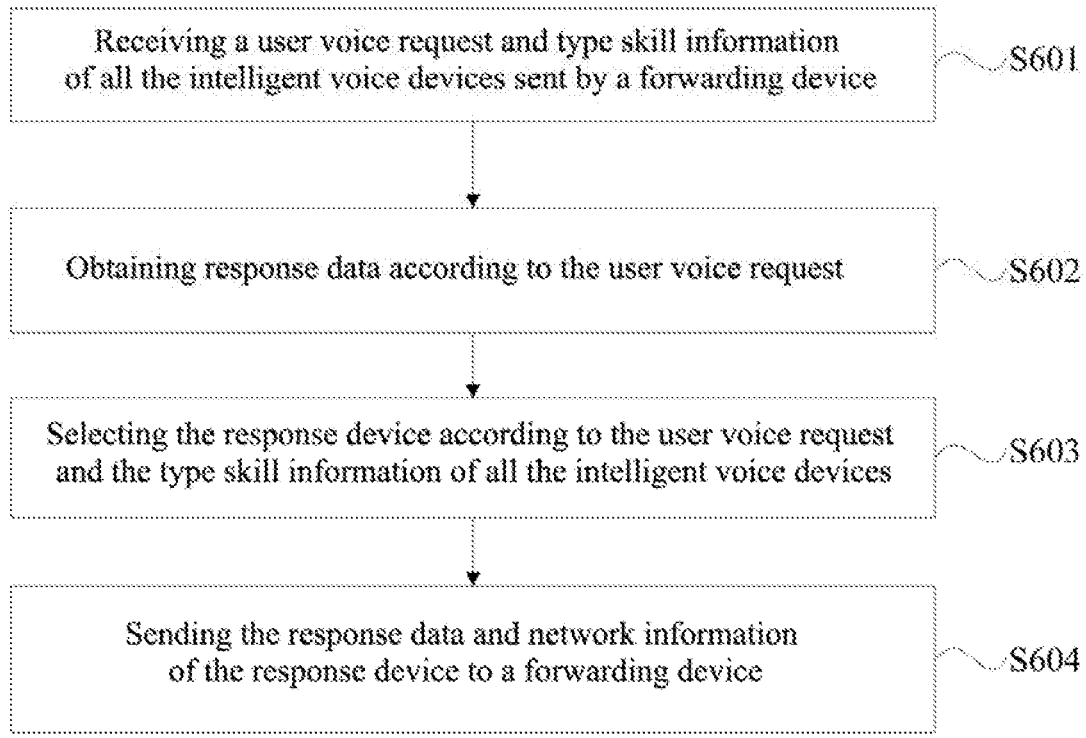
FIG. 6 shows flowchart of a method for interaction of intelligent voice devices according to Embodiment 3 of the present application.

FIG. 6 is flowchart of a method for interaction of intelligent voice devices according to Embodiment 3 of the present application; as shown in FIG. 6, the execution body of the method for interaction of intelligent voice devices provided by present embodiment is an apparatus for interaction of intelligent voice devices. The apparatus for interaction of intelligent voice devices can be integrated on the cloud device which may be a computer, a server, or the like. The method for interaction of the intelligent voice devices provided by this embodiment includes the following steps.

Step 601: receiving a user voice request and type skill information of all the intelligent voice devices sent by a forwarding device.

Specifically, after receiving the user voice request, the forwarding device sends the user voice request to the cloud device, and the cloud device receives the user voice request sent by the forwarding device. The cloud device further receives type skill information of all intelligent voice devices sent by the master device to the forwarding device; where the network information of the intelligent device includes: an identifier and a network IP address of the intelligent voice device; the type skill information of the intelligent voice device includes: type information and skill information of the intelligent voice device. The skill information of the intelligent voice device indicates the capabilities of the intelligent voice device.

Step 602: obtaining response data according to the user voice request.

Specifically, in this embodiment, the user voice request is identified and the response data matching the user voice request is obtained.

In this embodiment, the obtaining response data according to the user voice request is illustrated as follows: the user voice request is "I want to watch Stephen Chow's movie", and the corresponding matched response data is the video data of the most popular movie of Stephen Chow.

Step 603: selecting the response device according to the user voice request and the type skill information of all the intelligent voice devices.

Specifically, in this embodiment, the matched type skill information is selected from the type skill information of all intelligent voice devices according to the user voice request, where the intelligent voice device corresponding to the matched type skill information is the selected response device.

Step 604: sending the response data and network information of the response device to a forwarding device.

In the method for interaction of intelligent voice devices provided by the present embodiment, a user voice request and type skill information of all intelligent voice devices sent by a forwarding device are received; response data is obtained according to the user voice request; the response device is selected according to the user voice request and the type skill information of all the intelligent voice devices; the response data and network information of the response device are sent to a forwarding device. The plurality of intelligent voice devices are interconnected, thereby the most appropriate response device can execute the cloud result requested by the forwarding device; and the plurality of awakened intelligent voice devices do not respond at the same time, thereby avoiding the confusion; further the capabilities of the intelligent voice devices are complementary to each other, which makes it easier to meet user needs.

Further, in this embodiment, the step 603: selecting the response device according to the user voice request and the type skill information of all the intelligent voice devices specifically includes:

firstly, determining type skill information that matches the user voice request;

secondly, selecting the intelligent voice device corresponding to the type skill information matching the user voice request as the response device.

Preferably, in this embodiment, the user voice request is identified, and type skill information matching the user voice request are determined, where the response device is selected from the intelligent voice device corresponding to the matched type skill information.

Further, if there are a plurality of intelligent voice devices corresponding to the type skill information matching the user voice request, the selecting the intelligent voice device corresponding to the type skill information matching the user voice request as the response device specifically includes:

select one at random from the plurality of intelligent voice devices corresponding to the type skill information matching the user voice request as the response device.

In this embodiment, selecting the response device according to the user voice request and the type skill information of all the intelligent voice devices is illustrated as follows: if the user voice request is "I want to watch a television program", an intelligent voice device having the screen playing skill, such as a smart TV, a smart phone, is obtained from the type skill information of all the intelligent voice devices, then one intelligent voice device is selected from the smart TV and the smart phone as the response device.

In the method for interaction of intelligent voice devices provided by the present embodiment, when the response device is selected according to the user voice request and the type skill information of all the intelligent voice devices, the type skill information that matches the user voice request is determined; the intelligent voice device corresponding to the type skill information matching the user voice request is selected as the response device; thus it is possible to select the response device that is the most appropriate for response; if there are a plurality of intelligent voice devices corresponding to the type skill information matching the user voice request, select one at random from the plurality of intelligent voice devices corresponding to the type skill information matching the user voice request as the response device. Thereby the plurality of response devices responding at a same time can be avoided, and the user experience can be further improved.

Figure 7:
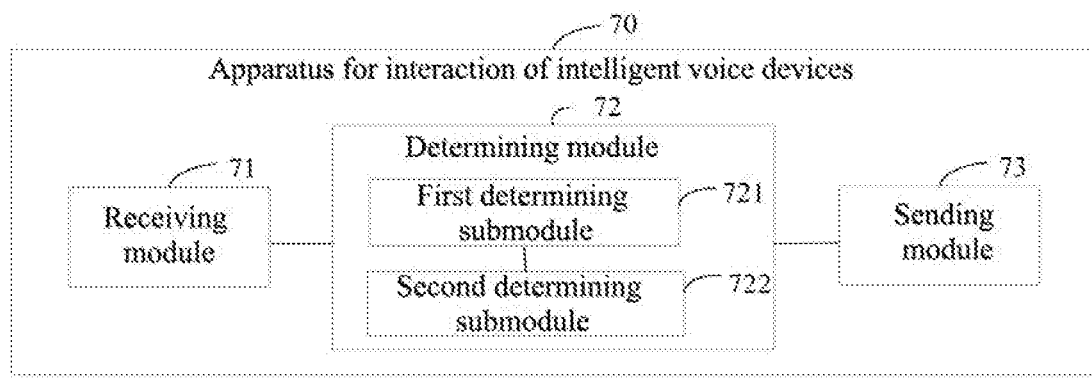
FIG. 7 shows a schematic structural diagram of an apparatus for interaction of intelligent voice devices according to Embodiment 4 of the present application.

FIG. 7 is a schematic structural diagram of an apparatus for interaction of intelligent voice devices according to Embodiment 4 of the present application; as shown in FIG. 7, the apparatus for interaction of intelligent voice devices 70 provided in this embodiment includes: a receiving module 71, a determining module 72, a sending module 73;

where the receiving module 71 is configured to: receive wake-up messages sent by respective awakened intelligent voice devices; the determining module 72 is configured to: determine a forwarding device according to the wake-up messages; the sending module 73 is configured to: send a forwarding instruction to the forwarding device to enable the forwarding device to receive the user voice request according to the forwarding instruction, where the forwarding instruction includes: type skill information of all intelligent voice devices; the sending module 73 is further configured to: send a non-response message to other awakened intelligent voice device other than the forwarding device.

Figure 2:
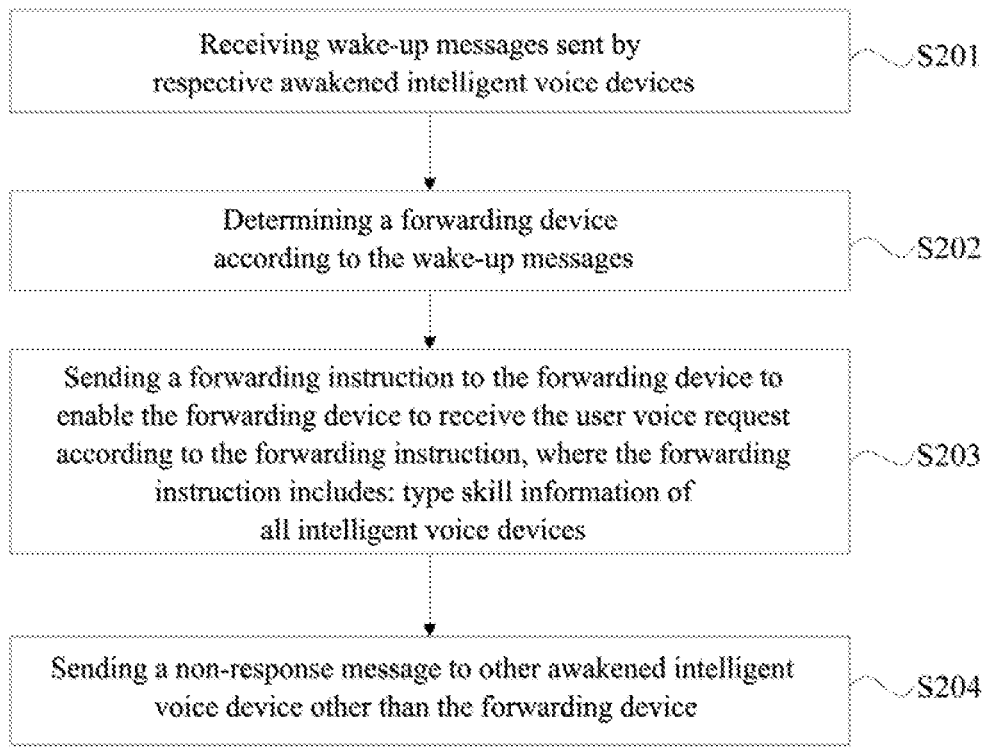
FIG. 2 shows flowchart of a method for interaction of intelligent voice devices according to Embodiment 1 of the present application.

The apparatus for interaction of intelligent voice devices provided in this embodiment may perform the technical solution of the method embodiment shown in FIG. 2. As the implementation principle and technical effect of the apparatus are similar to those of the method, details will not be described here.

Further, as shown in FIG. 7, in the apparatus for interaction of intelligent voice devices provided by the present embodiment, the determining module 72 specifically includes: a first determining submodule 721 and a second determining submodule 722.

Further, the first determining submodule 721 is configured to determine an awakened intelligent voice device that is closest to the user according to the wake-up message. The second determining submodule 722 is configured to determine the awakened intelligent voice device closest to the user as the forwarding device.

Further, the first determining submodule 721 is specifically configured to: obtain volume strengths of the wake-up messages sent by the respective intelligent voice devices; and determine an awakened intelligent voice device corresponding to the wake-up message with the highest volume strength as the awakened intelligent voice device closest to the user.

Further, the apparatus for interaction of intelligent voice devices provided in this embodiment may perform the technical solution of the method embodiment shown in FIG. 3. As the implementation principle and technical effect of the apparatus are similar to those of the method, details will not be described here.

Embodiment 4

Figure 8:
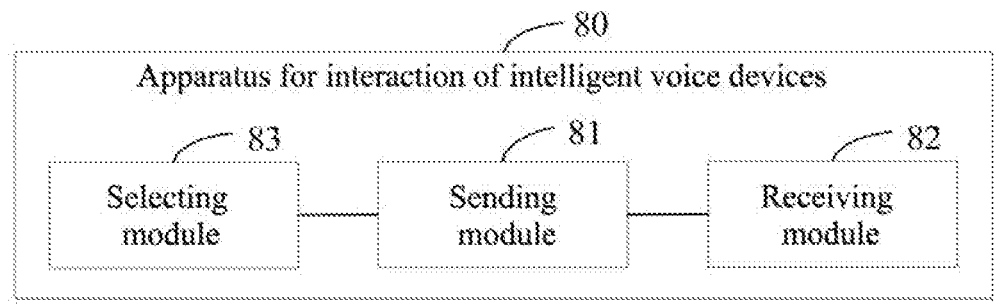
FIG. 8 shows a schematic structural diagram of an apparatus for interaction of intelligent voice devices according to Embodiment 5 of the present application.

FIG. 8 is a schematic structural diagram of an apparatus for interaction of intelligent voice devices according to Embodiment 4 of the present application; as shown in FIG. 8, the apparatus for interaction of intelligent voice devices 80 provided in this embodiment includes: a sending module 81 and a receiving module 82;

where the sending module 81 is configured to: send a wake-up message to a master device; the receiving module 82 is configured to: receive a forwarding instruction sent by the master device, where the forwarding instruction includes: type skill information of all intelligent voice devices; the receiving module 82 is further configured to: receive a user voice request; the sending module 81 is further configured to: send the user voice request and the type skill information of all the intelligent voice devices to the cloud device; the receiving module 82 is further configured to: receive response data and network information of the response device sent by the cloud device; the sending module 81 is further configured to: send an execution instruction including response data to the response device according to the network information of the response device so that the response device executes the response data according to the execution instruction.

The apparatus for interaction of intelligent voice devices provided in this embodiment may perform the technical solution of the method embodiment shown in FIG. 4. As the implementation principle and technical effect of the apparatus are similar to those of the method, details will not be described here.

Further, as shown in FIG. 8, the apparatus for interaction of intelligent voice devices provided by the present embodiment further includes: a selecting module 83.

Further, the sending module 81 is specifically configured to: receive user voice information; perform identification of a wake-up word on the user voice information; and send the wake-up message to the master device if the identification is successful.

Further, the selecting module 83 is configured to: select a master device according to a selection policy.

Optionally, the selecting module 83 is specifically configured to: obtain joining times of all the intelligent voice devices joining the network; and select an intelligent voice device with an earliest joining time as the master device.

Optionally, the selecting module 83 is specifically configured to: selecting the master device from all the intelligent voice devices by means of a raft algorithm.

Further, the apparatus for interaction of intelligent voice devices provided in this embodiment may perform the technical solution of the method embodiment shown in FIG. 5. As the implementation principle and technical effect of the apparatus are similar to those of the method, details will not be described here.

Embodiment 5

Figure 9:
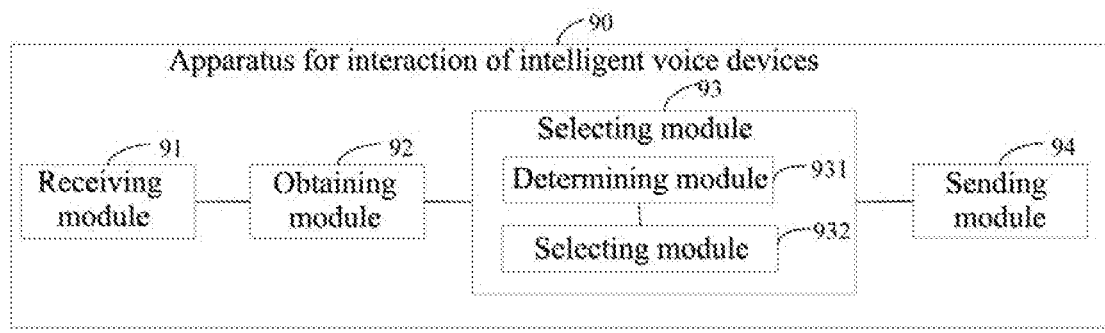
FIG. 9 shows a schematic structural diagram of an apparatus for interaction of intelligent voice devices according to Embodiment 6 of the present application.

FIG. 9 is a schematic structural diagram of an apparatus for interaction of intelligent voice devices according to Embodiment 5 of the present application; as shown in FIG. 9, the apparatus for interaction of intelligent voice devices 90 provided in this embodiment includes: a receiving module 91, an obtaining module 92, a selecting module 93 and a sending module 94;

where the receiving module 91 is configured to: receive a user voice request and type skill information of all the intelligent voice devices sent by a forwarding device; the obtaining module 92 is configured to: obtain response data according to the user voice request; the selecting module 93 is configured to select the response device according to the user voice request and the type skill information of all the intelligent voice devices; and the sending module 94 is configured to send the response data and network information of the response device to the forwarding device.

The apparatus for interaction of intelligent voice devices provided in this embodiment may perform the technical solution of the method embodiment shown in FIG. 6. As the implementation principle and technical effect of the apparatus are similar to those of the method, details will not be described here.

Further, in the apparatus for interaction of intelligent voice devices provided in this embodiment, the selecting module 93 specifically includes: a determining submodule 931 and a selecting submodule 932;

where the determining submodule 931 is configured to determine type skill information that matches the user voice request; the selecting submodule 932 is configured to select the intelligent voice device corresponding to the type skill information matching the user voice request as the response device.

Further, if there are a plurality of intelligent voice devices corresponding to the type skill information matching the user voice request, the selecting submodule 932 is specifically configured to: select one at random from the plurality of intelligent voice devices corresponding to the type skill information matching the user voice request as the response device.

Embodiment 6

Figure 10:
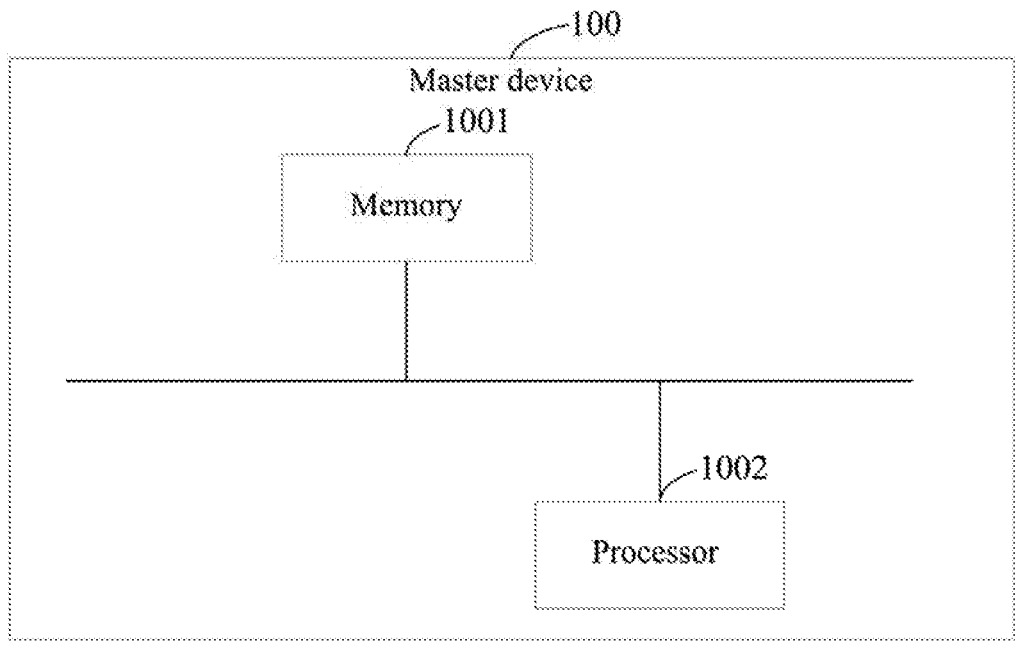
FIG. 10 shows a schematic structural diagram of a master device according to Embodiment 7 of the present application.

FIG. 10 is a schematic structural diagram of a master device according to Embodiment 6 of the present application; as shown in FIG. 10, the master device 100 provided in this embodiment includes: a memory 1001, a processor 1002, and a computer program;

where the computer program is stored in the memory 1001 and configured to be executed by the processor 1002 to implement the method for interaction of intelligent voice devices as provided in the Embodiment 1 of the present application.

The related description can be understood by referring to the related descriptions and effects corresponding to the steps in FIG. 2 to FIG. 3, and no further description is provided here.

Embodiment 7

Figure 11:
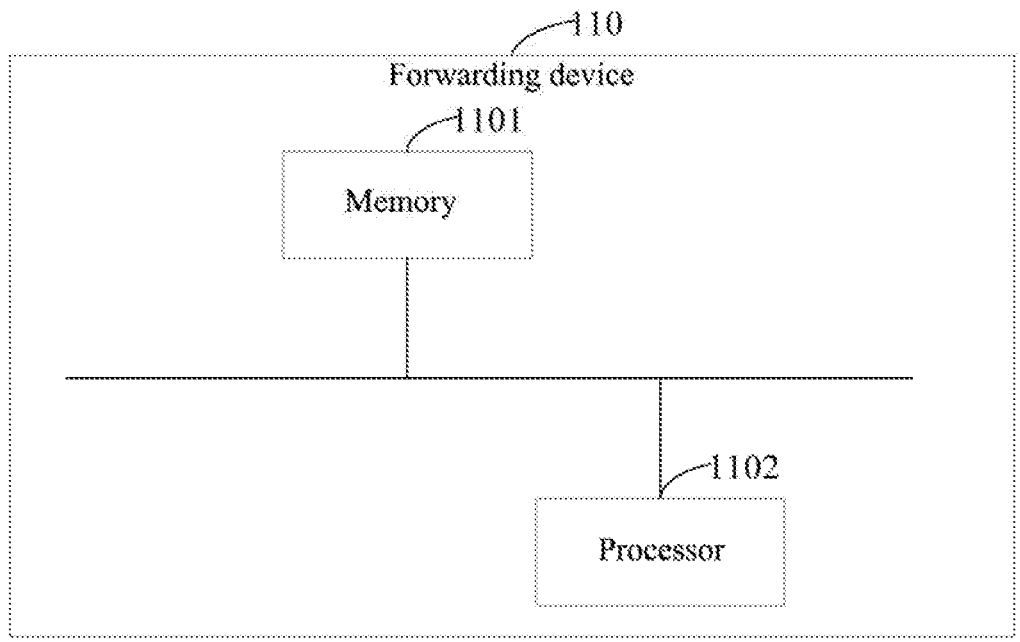
FIG. 11 shows a schematic structural diagram of a forwarding device according to Embodiment 8 of the present application.

FIG. 11 is a schematic structural diagram of a forwarding device according to Embodiment 7 of the present application; as shown in FIG. 11, the forwarding device 110 provided in this embodiment includes: a memory 1101, a processor 1102, and a computer program;

where the computer program is stored in the memory 1101 and configured to be executed by the processor 1102 to implement the method for interaction of intelligent voice devices as provided in the Embodiment 2 of the present application.

The related description can be understood by referring to the related descriptions and effects corresponding to the steps in FIG. 4 to FIG. 5, and no further description is provided here.

Embodiment 8

Figure 12:
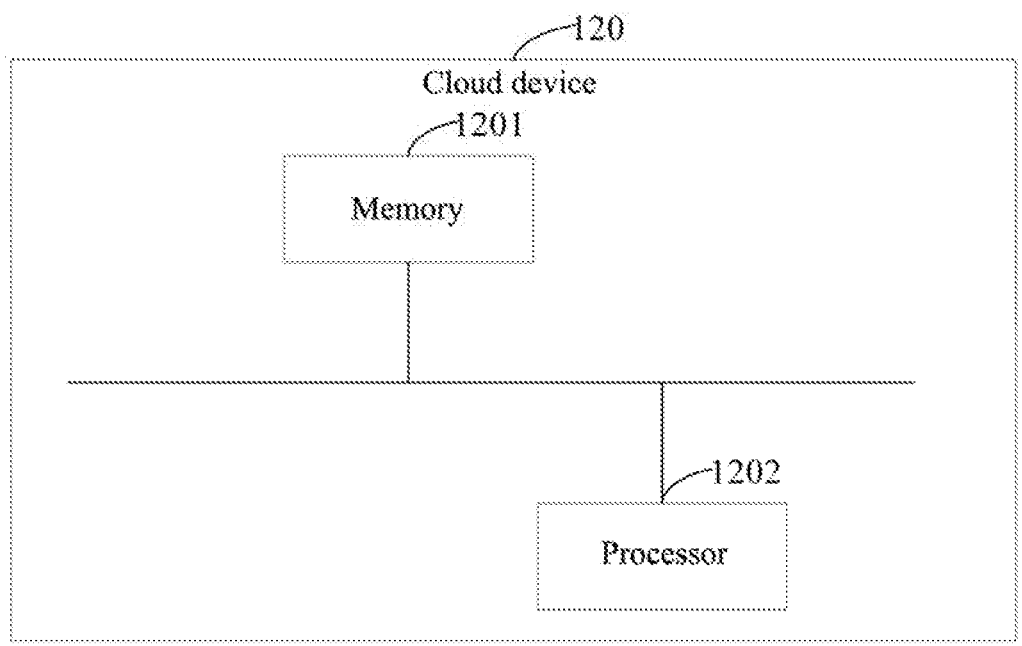
FIG. 12 shows a schematic structural diagram of a cloud device according to Embodiment 9 of the present application.

FIG. 12 is a schematic structural diagram of a cloud device according to Embodiment 8 of the present application; as shown in FIG. 12, the cloud device 120 provided in this embodiment includes: a memory 1201, a processor 1202, and a computer program;

where the computer program is stored in the memory 1201 and configured to be executed by the processor 1202 to implement the method for interaction of intelligent voice devices as provided in the Embodiment 3 of the present application.

The related description can be understood by referring to the related descriptions and effects corresponding to the steps in FIG. 6, and no further description is provided here.

Embodiment 9

Embodiment 9 of the present application further provides a computer readable storage medium, on which a computer program is stored, and the computer program is executed by the processor to implement the method for interaction of intelligent voice devices provided by the Embodiment 1 of the present application.

Embodiment 10

Embodiment 10 of the present application further provides a computer readable storage medium, on which a computer program is stored, and the computer program is executed by the processor to implement the method for interaction of intelligent voice devices provided by the Embodiment 2 of the present application.

Embodiment 11

Embodiment 11 of the present application further provides a computer readable storage medium, on which a computer program is stored, and the computer program is executed by the processor to implement the method for interaction of intelligent voice devices provided by the Embodiment 3 of the present application.

In the several embodiments provided by the present application, it should be understood that the disclosed apparatus and method may be implemented in other manners. For example, the apparatus embodiments described above are merely illustrative. For example, the division of modules is only a logical function division, and there may be other division manners in actual implementation. For example, multiple modules or components may be combined or integrated into another system, or some features may be omitted or not implemented. In addition, the mutual coupling, direct coupling or communication connection shown or discussed may be an indirect coupling or communication connection through some interfaces, devices or modules, and may be electrical, mechanical or otherwise.

The modules described as separate components may or may not be physically separate, and the components displayed as modules may or may not be physical modules, that is, they may be located in one place, or may be distributed to multiple network modules. Some or all of the modules may be selected according to actual needs to achieve the purpose of the solution of the embodiment.

In addition, respective functional modules in each embodiment of the present application may be integrated into one processing module, or the respective modules may exist physically separately, or two or more modules may be integrated into one module. The above integrated module may be implemented in the form of hardware or in the form of hardware and software function modules.

Program code for implementing the methods of the present application can be written in any combination of one or more programming languages. The program code can be provided to a processor or controller of a general purpose computer, a special purpose computer or other programmable data processing apparatus, thus when the program code is executed by the processor or controller, the functions/operations specified in the flowcharts and/or block diagrams can be implemented. The program code may be entirely executed on the machine, partly executed on the machine, or as a stand-alone software package partly executed on a machine and partly executed on a remote machine, or entirely executed on a remote machine or server.

In the context of the present application, a machine-readable medium may be a tangible medium that may include or store a program for use by or in combination with an instruction execution system, an apparatus, or a device. The machine readable medium may be a machine readable signal medium or a machine readable storage medium. A machine-readable medium may include, but is not limited to, an electronic, magnetic, optical, electromagnetic, infrared, or semiconducting system, apparatus, or device, or any suitable combination of the foregoing. More specific examples of machine readable storage media may include electrical connections based on one or more wires, a portable computer disk, a hard disk, a random access memory (RAM), a read only memory (ROM), an erasable programmable read only memory (EPROM or flash memory), optical fiber, compact disk read only memory (CD-ROM), optical storage device, magnetic storage device, or any suitable combination of the foregoing.

In addition, although the operations are depicted in a particular order, this should be understood that such operations are performed in the particular order shown or in the sequential order, or that all illustrated operations should be performed to achieve the desired results. Multitasking and parallel processing may be advantageous in certain circumstances. Likewise, although several specific implementation details are included in the above discussion, they should not be interpreted as limitations to the scope of the application. Certain features that are described in the context of separate embodiments may also be implemented in combination in a single implementation. Conversely, various features that are described in the context of a single implementation may be implemented in multiple implementations, either individually or in any suitable sub-combination.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A method for interaction of intelligent voice devices, comprising:
    receiving wake-up messages sent by respective awakened intelligent voice devices;
    determining a forwarding device according to the wake-up messages;
    sending a forwarding instruction to the forwarding device to enable the forwarding device to receive a user voice request according to the forwarding instruction, wherein the forwarding instruction comprises: type skill information of all intelligent voice devices;
    sending a non-response message to other awakened intelligent voice device other than the forwarding device; and
    wherein the determining a forwarding device according to the wake-up messages specifically comprises:
    determining an awakened intelligent voice device that is closest to a user according to the wake-up messages; and
    determining the awakened intelligent voice device closest to the user as the forwarding device.

2. The method according to claim 1, wherein the determining an awakened intelligent voice device that is closest to the user according to the wake-up messages specifically comprises:
    obtaining volume strengths of the wake-up messages sent by the respective intelligent voice devices; and
    determining an awakened intelligent voice device corresponding to the wake-up message with a highest volume strength as the awakened intelligent voice device closest to the user.

3. A method for interaction of intelligent voice devices, comprising:
    sending a wake-up message to a master device;
    receiving a forwarding instruction sent by the master device, wherein the forwarding instruction comprises: type skill information of all intelligent voice devices;
    receiving a user voice request;
    sending the user voice request and the type skill information of all the intelligent voice devices to a cloud device;
    receiving response data and network information of a response device sent by the cloud device;
    sending an execution instruction comprising the response data to the response device according to the network information of the response device such that the response device executes the response data according to the execution instruction; and
    wherein the forwarding device is the awakened intelligent voice device that is closest to a user.

4. An apparatus for interaction of intelligent voice devices, comprising:
    a processor and a computer-readable medium for storing program codes, which, when executed by the processor, cause the processor to implement the method according to claim 3.

5. The method according to claim 3, wherein the sending a wake-up message to a master device specifically comprises:
    receiving user voice information;
    performing identification of a wake-up word on the user voice information; and
    sending the wake-up message to the master device if the identification is successful.

6. The method according to claim 3, wherein before the sending a wake-up message to a master device, the method further comprises:
    selecting the master device according to a selection policy.

7. The method according to claim 6, wherein the selecting the master device according to a selection policy specifically comprises:
    obtaining joining times of all the intelligent voice devices joining a network; and
    selecting an intelligent voice device with an earliest joining time as the master device.

8. The method according to claim 6, wherein the selecting the master device according to a selection policy specifically comprises:
    selecting the master device from all the intelligent voice devices by means of a raft algorithm.

9. A method for interaction of intelligent voice devices, comprising:
    receiving a user voice request and type skill information of all intelligent voice devices sent by a forwarding device;
    obtaining response data according to the user voice request;
    selecting a response device according to the user voice request and the type skill information of all the intelligent voice devices;
    sending the response data and network information of the response device to the forwarding device; and
    wherein the forwarding device is the awakened intelligent voice device that is closest to a user.

10. The method according to claim 9, wherein the selecting a response device according to the user voice request and the type skill information of all the intelligent voice devices specifically comprises:
    determining type skill information that matches the user voice request;
    selecting an intelligent voice device corresponding to the type skill information matching the user voice request as the response device.

11. The method according to claim 10, wherein if there are a plurality of intelligent voice devices corresponding to the type skill information matching the user voice request, the selecting an intelligent voice device corresponding to the type skill information matching the user voice request as the response device specifically comprises:
    selecting one at random from the plurality of intelligent voice devices corresponding to the type skill information matching the user voice request as the response device.

12. An apparatus for interaction of intelligent voice devices, comprising:
    a processor and a computer-readable medium for storing program codes, which, when executed by the processor, cause the processor to implement the method according to claim 1.

13. An apparatus for interaction of intelligent voice devices, comprising:
    a processor and a computer-readable medium for storing program codes, which, when executed by the processor, cause the processor to implement the method according to claim 9.

14. A non-transitory computer readable storage medium, having a computer program stored thereon, wherein the program is executed by a processor so as to implement the method according to claim 1.

15. A non-transitory computer readable storage medium, having a computer program stored thereon, wherein the program is executed by a processor so as to implement the method according to claim 9.

16. A non-transitory computer readable storage medium, having a computer program stored thereon, wherein the program is executed by a processor so as to implement the method according to claim 3.

* * * * *